United States Patent
Farnsworth et al.

(10) Patent No.: US 6,377,554 B1
(45) Date of Patent: Apr. 23, 2002

(54) APPARATUS AND METHOD FOR DYNAMICALLY ALLOCATING CHANNELS FOR TRANSMISSION OF DATA

(75) Inventors: Kyle A. Farnsworth, Huntsville; C. Brian Goodwin, Madison, both of AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 09/122,159

(22) Filed: Jul. 24, 1998

(51) Int. Cl.$^7$ .................................................. H04L 1/00
(52) U.S. Cl. ........................ 370/252; 370/252; 370/468
(58) Field of Search .......................... 370/468, 280, 370/294, 352, 402, 401, 395, 231, 252, 358, 376, 398, 466, 253; 709/226, 218, 222; 455/422, 435, 437

(56) References Cited

U.S. PATENT DOCUMENTS

| | | | | |
|---|---|---|---|---|
| 5,282,207 A | * | 1/1994 | Jurkervich et al. | 370/468 |
| 5,416,771 A | * | 5/1995 | Iwata | 370/410 |
| 5,442,625 A | * | 8/1995 | Gitlin et al. | 370/342 |
| 5,615,213 A | * | 3/1997 | Griefer | 370/412 |
| 5,677,905 A | * | 10/1997 | Bigham et al. | 370/395 |
| 5,951,637 A | * | 9/1999 | Kuzma | 709/204 |
| 6,098,091 A | * | 8/2000 | Kisor | 709/202 |

* cited by examiner

Primary Examiner—Salvatore Cangialosi
(74) Attorney, Agent, or Firm—Allen, Dyer, Doppelt, Milbrath & Gilchrist, P.A.

(57) ABSTRACT

In a data communication system having a two or more channels of varying bandwidth and cost it is desirable to select a channel that meets data transfer needs and minimizes cost. In basic rate ISDN a D channel is typically used to provide low bandwidth service. When a user needs more bandwidth, the user switches to a B channel or two B channels. The automatic channel selection method and apparatus described provides a user with adjustable parameters to customize performance of a ISDN service unit. An anti-thrashing algorithm is provided to minimize frequent call setups and disconnects.

9 Claims, 5 Drawing Sheets

APPARATUS AND METHOD FOR DYNAMICALLY ALLOCATING CHANNELS FOR TRANSMISSION OF DATA

FIELD OF THE INVENTION

The present invention relates to telecommunication systems and, more specifically, to a method and apparatus for switching between data communication channels having different bandwidths. The invention provides a means for switching between a low bandwidth channel and a high bandwidth channel in response to the bandwidth needs of the user. The means for switching is designed to avoid a thrashing problem that may be caused by some data inputs.

BACKGROUND OF THE INVENTION

Switched data communication service has evolved from the low-speed modems of the early 1980s to current high-speed modems such as a V.34 modem and 56 K products. In addition to modems, switched digital service such as DDS service and basic rate ISDN service is now available from service providers. The data bandwidth or bandwidth for the above products is between 1.2 Kbps and 128 Kbps. Early data communication products used the analog PSTN where the data rate was dependent of the characteristics of the channel. Current ISDN service units typically have 1 D channel and 2 B channels where the D channel has a 16 Kbps bandwidth and the B channels have a 64 Kbps bandwidth.

In Basic Rate ISDN ("BRI") service the D channel is always connected between the user and the central office switch. The low bandwidth D channel is used to send signaling information and packet data, such as X.25 packets. The B channels, B1 and B2, are used to provided data and voice services when coupled to the appropriate equipment at the customers premise. The B channels provide high bandwidth service and typically have a cost structure proportional to use. Because the D channel cost has a low fixed monthly cost it is desirable to use the D channel whenever possible. A typical data communication device at a customer premise is an ISDN service unit, such as an Adtran Express XR, Express XRT, Express XL, or Express XLT may be used for connection for BRI service.

It has been determined that a cost effect use of BRI is an Always On/Dynamic ISDN ("AO/DI") architecture. The AO/DI architecture is described in a white paper by Kuzma in a November 1996 contribution to VIA (Vendors ISDN Association). AO/DI is a networking service that provides packet service on the low bandwidth D channel and only uses a high bandwidth B channel upon user request. A method for determining when to make a user request is not discussed by Kuzma.

An invention described in U.S. Pat. No. 5,615,213 of Allan Griefer provides a means for implementing AO/DI. The Griefer invention is based on both message length and send queue length for switching to a B channel while operating in the packet mode of the D channel. Griefer does not provide directions for going from the B channel back to the D channel. Further Griefer does not consider the thrashing problem, frequent switching back and forth between the D channel and B channel, that may occur with certain data conditions.

Hence there is a need for an improved method and apparatus for providing AO/DI service. Such a method and apparatus should avoid the thrashing problem and maximize the benefits of AO/DI service. Further the method should be cost effective and have parameters that may be changed to meet the needs of individual users.

SUMMARY OF THE INVENTION

In accordance with the present invention these needs and objectives are successfully addressed by a new and improved method and apparatus, which is operative to controllably switch between a first communication channel, such as a low bandwidth ISDN D channel, and a second communication channel, such as a higher bandwidth ISDN B channel, in dependence upon lengths of time that average percentages of transmit and receive bandwidth satisfy prescribed threshold relationships. The D channel is always on, while one or both of the B channels becomes operational upon a request from the user. The invention uses the D channel and controllably switches to one or more B channels when necessary.

With the D channel providing data service, then in response to a sample timer timing out at a predetermined sample time, an average transmit rate is determined by dividing the number of bytes transmitted by the value of the sample time. The average receive rate is then determined by dividing the number of bytes received by the value of the sample time. The average percentage 'transmit' bandwidth is determined by dividing the average transmit rate by the bandwidth available, and the average percentage 'receive' bandwidth is determined by dividing the average receive rate by the bandwidth available. For typical D channel usage, the bandwidth available is 14 Kbps out of the 16 Kbps of the D channel.

Switching from the low bandwidth D channel to a higher bandwidth B channel occurs, if either of the average percentage transmit bandwidth or the average percentage receive bandwidth exceeds a prescribed upper threshold, and a bandwidth increase timer has expired. The bandwidth increase timer is used to prevent frequent and uncalled-for switching to the B channel and has a user presetable expiration value.

To determine whether the higher bandwidth condition demand has subsided—allowing return to the D channel—the average percentage transmit bandwidth is compared with a lower threshold, less than the upper threshold. Switching back to the low bandwidth D channel from the higher bandwidth B channel occurs, if the average percentage bandwidth drops below the lower prescribed upper threshold, and a bandwidth decrease timer has expired. Similar to the bandwidth increase timer, the bandwidth decrease timer is used to prevent frequent and uncalled-for switching back to the D channel from the B channel and may be preset by the user. The combination of the actions of the bandwidth increase timer and the bandwidth decrease timer prevent a frequent back and forth switching referred to as thrashing.

DETAILED DESCRIPTION

Figure 1:
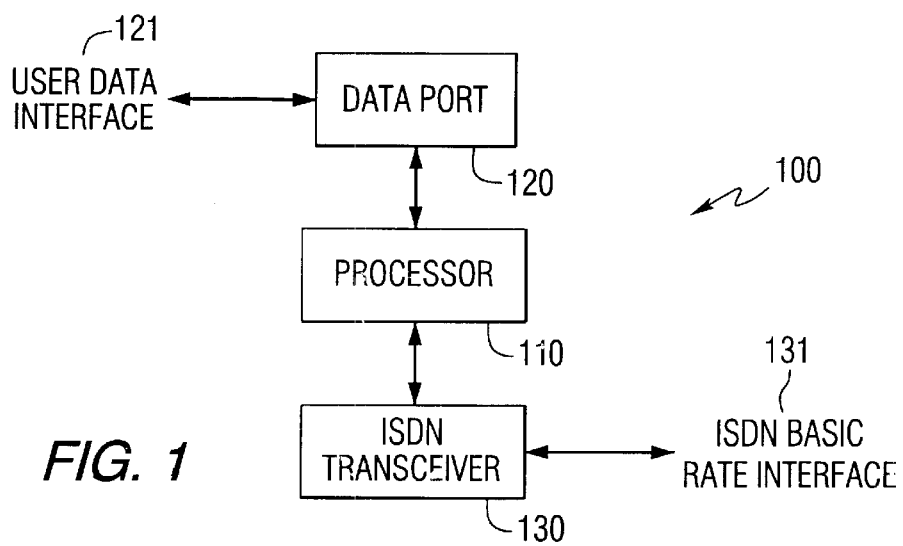
FIG. 1 illustrates a data communication system in accordance with the present invention.

Before describing in detail the variable communication channel bandwidth allocation mechanism of the present invention, it should be observed that the invention resides primarily in what is effectively a prescribed arrangement of conventional communication circuits and associated digital signal processing components and an attendant supervisory control program therefor, that controls the operations of such circuits and components. Consequently, the configuration of such is circuits and components and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustration and associated flow charts of the control program to be described are primarily intended to show the major components of the system in a convenient functional grouping and processing sequence, whereby the present invention may be more readily understood.

An arrangement of elements for providing Basic Rate ISDN service and incorporating an AO/DI feature is shown in FIG. 1. A processor 110 contains serial communications hardware and is programmed to couple signals from data port 120 to an ISDN transceiver 130. The processor is programmed to function as a prior art ISDN service unit and further programmed to serve as a controller for the present invention as will be seen. The data port 120 is coupled to receive user data 121, where the user data may be from a data terminal, a local area network or other source. Basic rate ISDN service provides for full duplex service having one D channel of 16 Kbps, and two B channels of 64 Kbps each. The D channel is capable of transferring data, typically as packets, at around 10 to 14 Kbps. The D channel also provides signaling information to and from the telephone companies central office ("Co"). The B channels can be used to transfer data, voice, video, or any service that may be provided over at data rates up to 128 Kbps.

The D channel is always on between the user and the Co as described in well known ISDN specifications. One or both of the B channels becomes operational upon a request from the user. Because of the typical cost structure associated with the D channel, a fixed monthly rate, and with the B channel, cost per connect time, it is usually desirable to use the D channel as much as possible and use the B channels only when necessary. However because some service providers charge for a per packet delivery on the D channel, a close look at the cost associated with the service is sometimes necessary. By appropriate setting of parameters of the present invention a user can minimize data transfer cost. The method of the present invention, described in FIGS. 2–5, is based on using the D channel and switching to one or more B channels when necessary.

Figure 2:
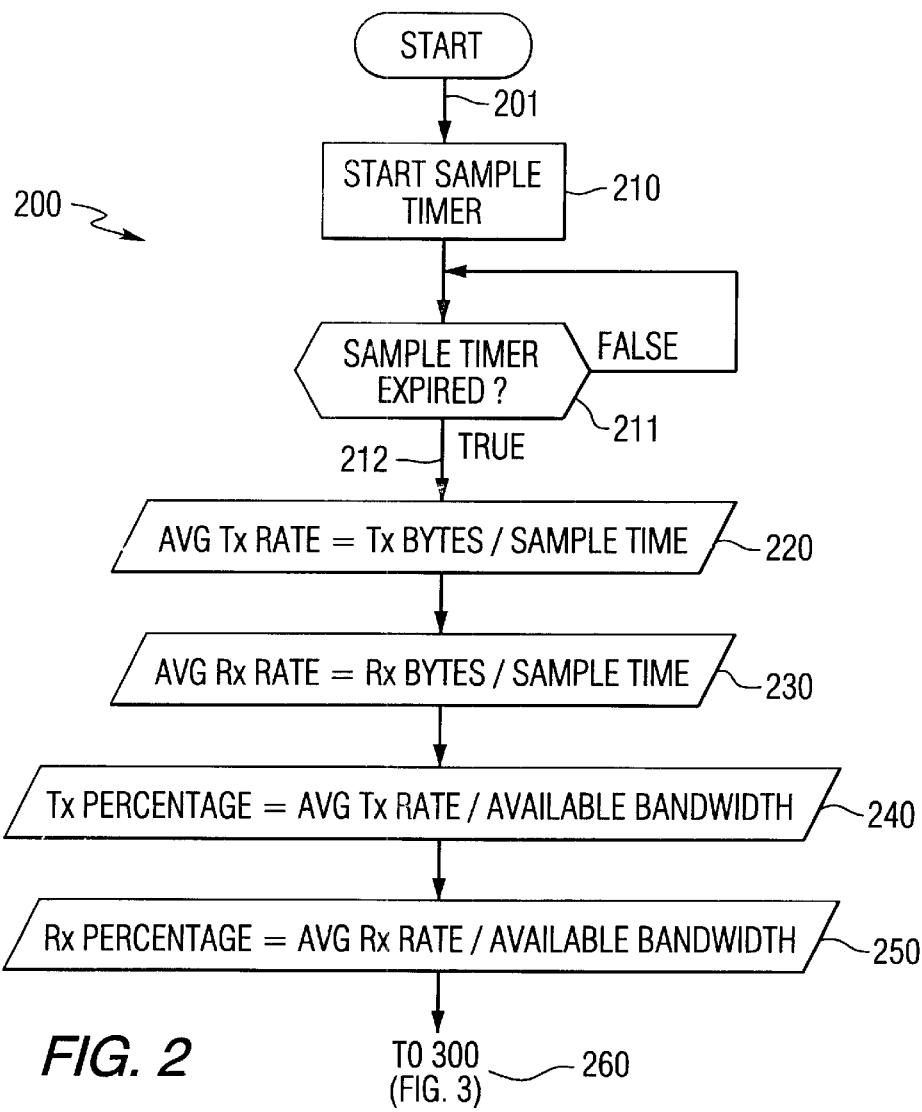
FIG. 2 is a flow chart illustrating elements of the present invention.

Referring now to FIG. 2, starting with the assumption the D channel is providing data service, the process begins, step 201, when a sample timer is started, step 210. The sample timer continues to run, the FALSE path of decision block 211 until a predetermined sample time is reached. When the sample timer expires, step 212, by reaching the predetermined sample time, then several detection and calculation steps occur. The average transmit rate is determined by dividing the number of bytes transmitted by the value of the sample time, step 220. Next the average receive rate is determined by dividing the number of bytes received by the value of the sample time, step 230. For the embodiment herein described a sample time value of 10 seconds is used. Next the average percentage transmit bandwidth ("APTB") is determined by dividing the average transmit rate by the bandwidth available, step 240. Then the average percentage receive bandwidth ("APRB") is determined by dividing the average receive rate by the bandwidth available, step 250. Typically the bandwidth available is 14 Kbps out of the 16 Kbps of the D channel.

Figure 3:
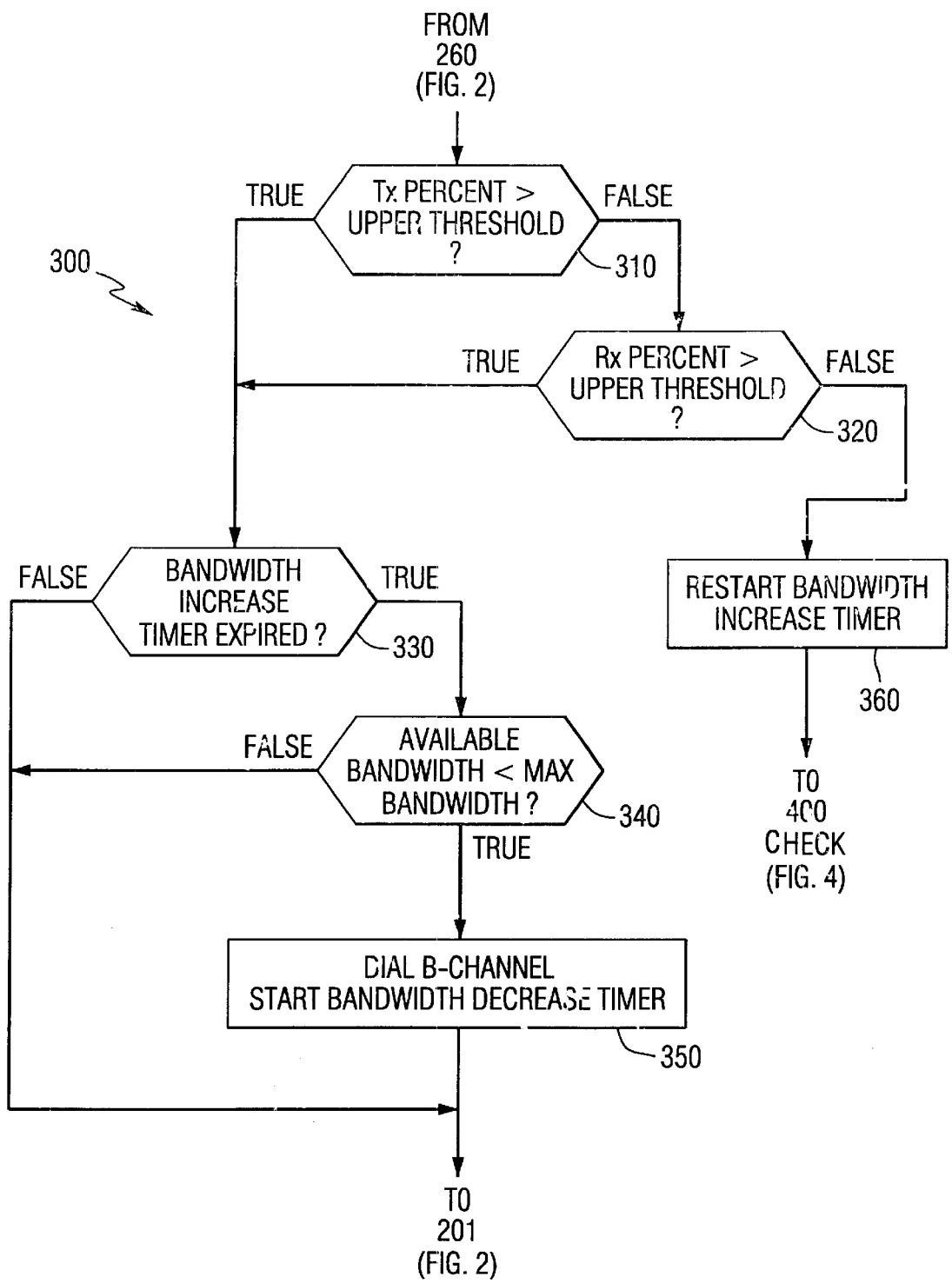
FIG. 3 is a flow chart illustrating decision elements for increasing bandwidth in accordance with the present invention.

The above calculated values for the average percentage transmit bandwidth and the average percentage receive bandwidth are saved and used according to the steps of the flow chart of FIG. 3. If the average percentage transmit bandwidth is greater than an upper threshold ("UT"), then the TRUE path of step 310 is taken, else the FALSE path is taken. The TRUE path of step 310 leads to step 330. If a bandwidth increase timer has expired, the TRUE path of step 330 is taken. If the bandwidth increase timer has not expired the FALSE path of step 330 is taken. If the available bandwidth is less than the maximum bandwidth available, the TRUE path of step 340, then a B channel is requested and started, step 350. When the FALSE path of step 340 is taken then return to step 201 of FIG. 2. The FALSE path of step 330 also causes a return to step 201. Returning to decision block 310, the FALSE path directs the actions to decision block 320. When the average percentage receive bandwidth is greater than the upper threshold, the TRUE path of step 320, the next step occurs at decision block 330. However if the average percentage receive bandwidth is not greater than the upper threshold, the FALSE path of step 320, then the bandwidth increase timer is restarted, step 360, and then go to the steps of FIG. 4. The upper threshold value for the current embodiment has a value of 80% of the channel bandwidth, but typically may have values between 50–90%. The actual value used for the upper threshold is not considered a limitation on the present invention.

In summary, a switch from the D channel to a B channel occurs when the following logic expression

[(APTB OR APRB)>UT] AND [bandwidth increase timer expired]

is TRUE where "OR" and "AND" are logic operations. Those skilled in the art may construct various scenarios and develop similar logic expressions for other channel transfers. The bandwidth increase timer is used to prevent frequent and uncalled-for switching to the B 1–5 channel and has an expiration value of 30 seconds. Those skilled in the art would appreciate a variety of values for the expiration value would fall within the scope of the present invention.

Figure 4:
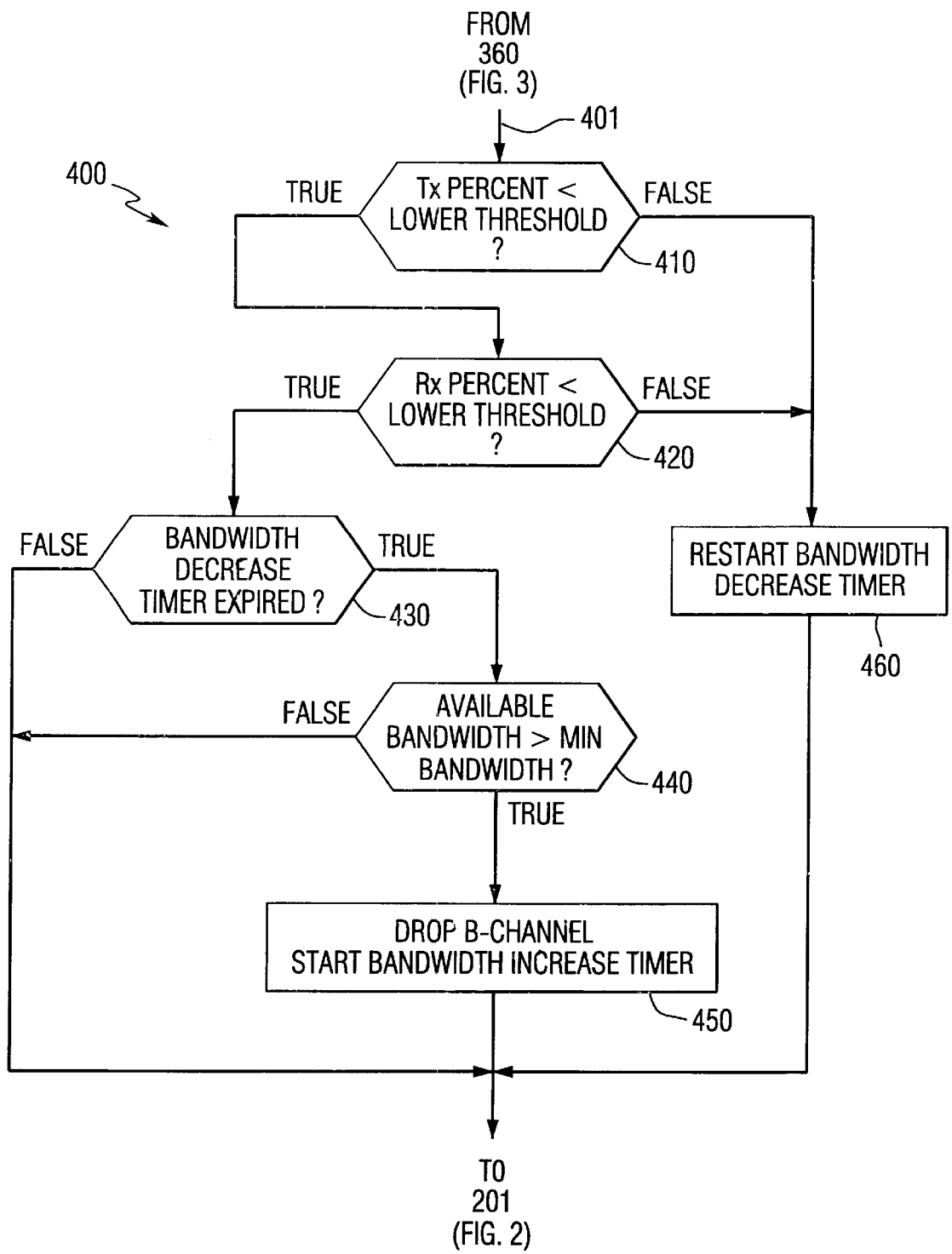
FIG. 4 is a flow chart illustrating decision elements for decreasing bandwidth in accordance with the present invention.

The FALSE path of step 310 followed by the FALSE path of step 320 directs the program to the steps of FIG. 4. Refer now to FIG. 4. After the start step 401, a decision step 410 is taken. If the average percentage transmit bandwidth is less than a lower threshold ("LT") then the TRUE path of step 410 directs program flow to step 420. The FALSE path of step 410 causes a restart of bandwidth decrease timer, step 460, followed by a return to step 201. The TRUE path of step 420 directs flow to step 430, else the FALSE path of step 420 causes a return to step 201. If the bandwidth decrease timer has expired, the TRUE path of step 430, step 440 is taken, else the FALSE path of step 430 causes a restart of the bandwidth decrease timer, step 460, and a return to step 201. Upon reaching step 440 the TRUE path of step 440 causes a B channel drop and the bandwidth increase timer is started, else a return to step 201 occurs via the FALSE path of step 440.

The bandwidth decrease timer is used to prevent frequent and uncalled-for switching to the D channel from the B channel and may be set by the user, a typical an expiration value for the bandwidth decrease timer is 60 seconds. The combination of the actions of the bandwidth increase timer and the bandwidth decrease timer prevent a frequent back and forth switching referred to as thrashing. For example certain sets of data transmission requirements could cause call setup and call breakdown every few seconds—an undesirable and inefficient use of ISDN service.

Those skilled in the art would appreciate that parameters of the described embodiment may take a variety of values and still fall within the scope of the present invention. For example the bandwidth decrease timer expiration value, the bandwidth increase timer expiration value, the upper threshold value, and lower threshold value may be set by the user. By varying these parameters a user may select a performance strategy that minimizes cost and still meets a data transfer need. Typically a product provided by a manufacturer would have factory default settings for all parameters and provide the user with a means for changing the parameters.

Figure 5:
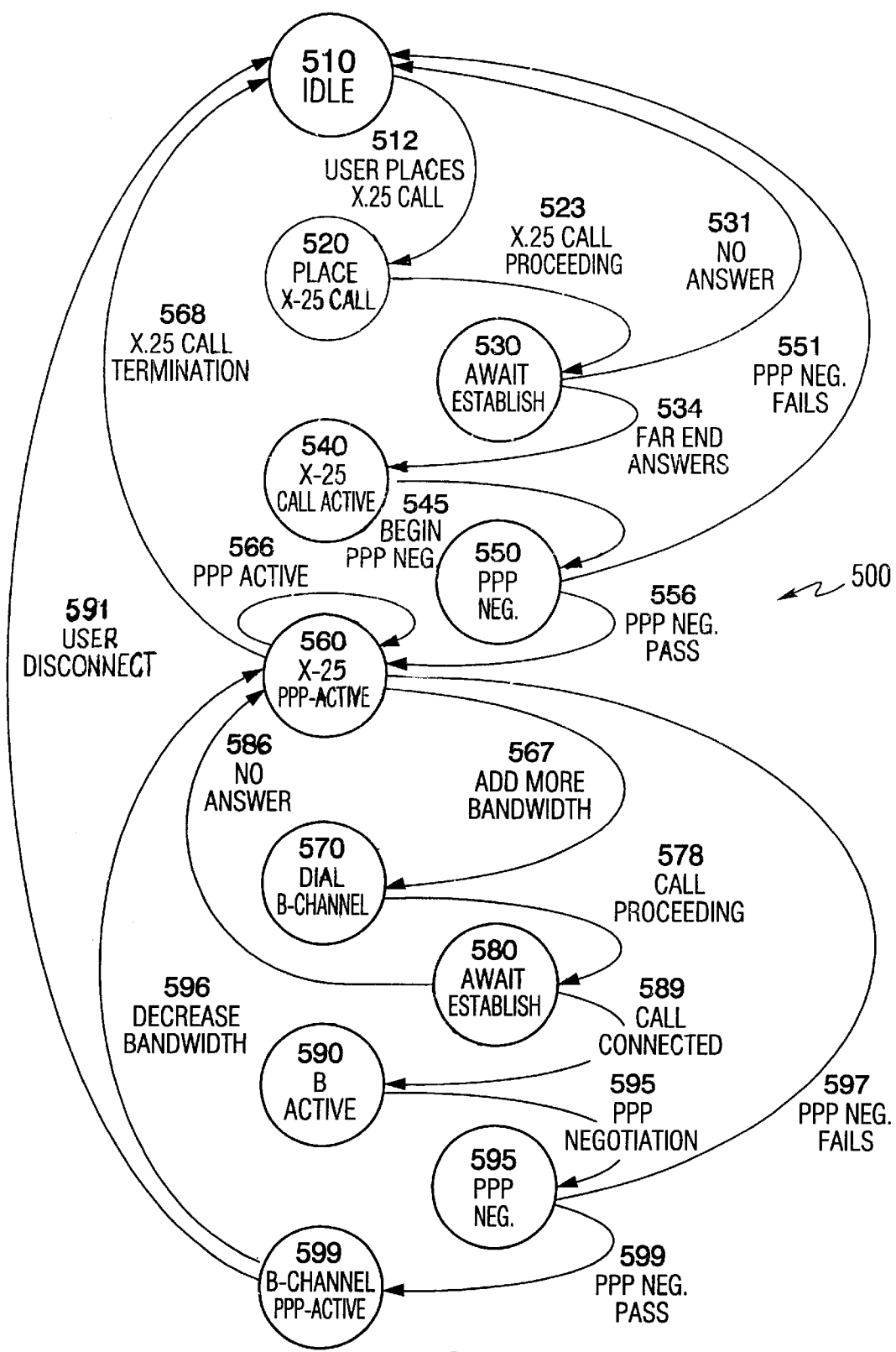
FIG. 5 illustrates a state diagram for a preferred embodiment of the present invention.

FIG. 5 is provided to illustrate the operation of a ISDN service unit that has incorporated the present invention. Although the state diagram as shown would be understood by those skilled in the art certain areas of the diagram are now described to allow for an understanding of the present invention. Data transfers initiated by a user occur when the ISDN service unit is in idle state 510. The path via states 520, 530, 540, 550 to state 560 allows for X.25 packet transfers. The activities 512, 523, 534,545 and 550 occur to cause a transition to state 560. If the call cannot be established a return to the idle state caused by activities 531 or 551. Data is transferred on the D channel when in state 560. If the algorithm of FIGS. 2–4 indicate more bandwidth is needed then states 570, 580, 590 and 595 allow for data transfer over a B channel as indicated by state 599. The actions required to reach state 599 are 567, 578, 589, 595,and 599. If a B channel cannot be established action 597 returns the service unit to state 560. When there is no user data to transfer actions 566 and 591 causes a return to the idle state. Details of each transition in the state diagram have not been provided since the steps of the present invention have been provided in detail in FIGS. 2–4 and the other transitions in the state diagram are described in ITU Recommendations and other standards.

Figure 6:
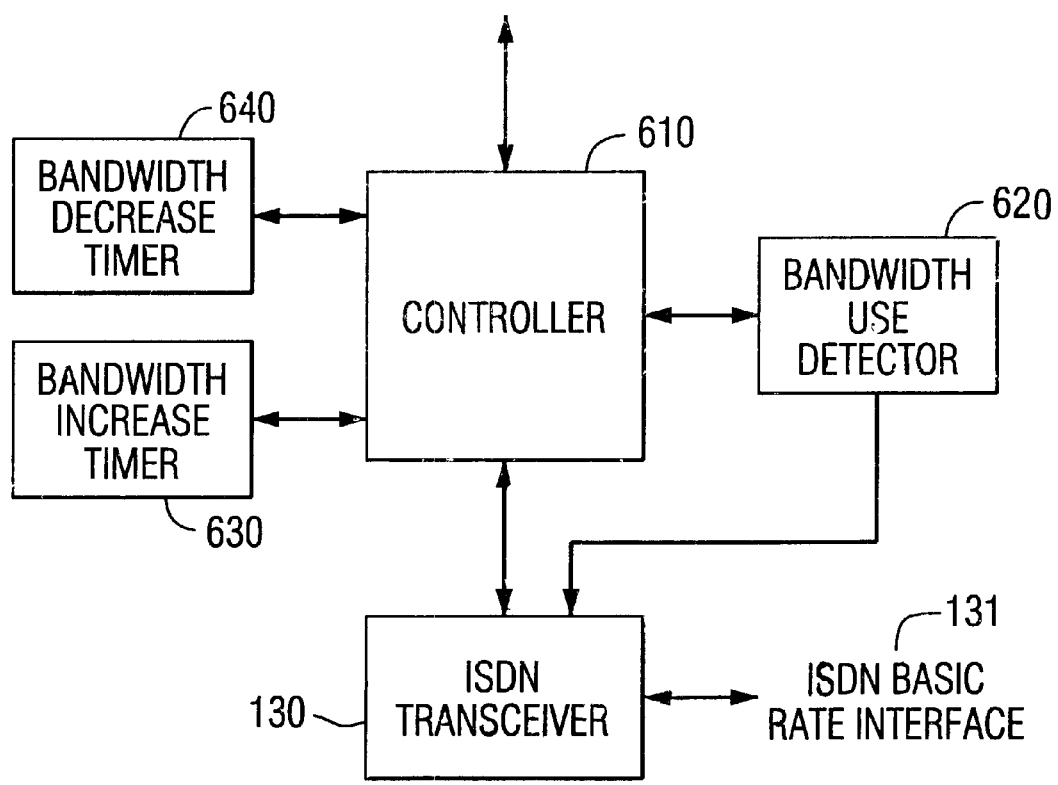
FIG. 6 is a block diagram of the present invention.

Referring now to FIG. 6 there is shown an apparatus in accordance with the present invention. A controller 610 is coupled to ISDN transceiver 130 and causes the transceiver to operate in accordance to the state diagram of FIG. 5. A bandwidth use detector is coupled to the transceiver and detects the percentage bandwidths for transmit and receive. The information from the detector is sent to the controller. The controller may direct the bandwidth detector to change the sampling time. A bandwidth increase timer 630 and bandwidth decrease timer 640 are also coupled to the controller. The values used by the two timers may be modified as directed by the controller. The control actions are directed in accordance to the flow charts of FIGS. 2–4 as described above in detail. Those skilled in the art would appreciate the two timers 630, 640 and the bandwidth user detector 620 could be implemented in a variety of hardware and software arrangements. The means for building timers and detectors is not a limitation on the present invention.

The present invention could be applied to a communication system having a plurality of communication channels. For example in a BRI system a first channel is the D channel, a second channel is a B channel, and a third channel is both B channels. Hence the first channel provides packet data at around 14 Kbps, the second channel provides 64 Kbps data service, and the third channel provides 128 Kbps data service. The scope of the present invention is not limited to BRI data services, but includes those services where an increase in demand requires additional data bandwidth.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims.

What is claimed is:

1. In a data communication device having a transmitter and a receiver, an apparatus for switching from a first communication channel having a low bandwidth to a second communication channel having a high bandwidth, the apparatus comprising:

a bandwidth use detector for detecting the transmitter average percentage transmit bandwidth;

a bandwidth increase timer for determining the amount of time of the data communication device has been connected using the first communication channel; and a controller coupled to the bandwidth use detector and to the bandwidth increase timer, the controller initiating a connection to the second communication channel when the average percentage transmission bandwidth exceeds a predetermined increase threshold value for a predetermined time, wherein the bandwidth use detector further detects the average percentage receive bandwidth; and the controller further initiates a connection to the second communication channel when the average percentage receive bandwidth exceeds the predetermined percentage decrease threshold value for a predetermined time.

2. The apparatus of claim 1, wherein the first channel is the D channel of an ISDN connection and the second channel is a B channel of said ISDN connection.

3. The apparatus of claim 1, wherein the increase threshold value is between 50 and 90 percent of the first communication channel bandwidth.

4. In a data communication device having a transmitter and a receiver, a method for switching from a first communication channel having a low bandwidth to a second communication channel having a high bandwidth comprising:

detecting a percentage average transmit bandwidth;

determining the amount of time of the data communication device has been connected using the first communication channel;

initiating a connection to the second communication channel when the percentage average transmit bandwidth obtained from the detecting step exceeds a predetermined increase threshold value for a predetermined time;

detecting a percentage average receive bandwidth; and initiating a connection to the first communication channel when the percentage average receive bandwidth obtained from the detecting step is less than the predetermined decrease threshold value for a predetermined time.

5. The method of claim 4, wherein the first channel is the D channel of an ISDN connection and the second channel is a B channel of said ISDN connection.

6. The method of claim 4, wherein the increase threshold value is between 50 and 90 percent of the first communication channel bandwidth.

7. In a data communication device having a transmitter and a receiver, a method for switching to a first communication channel having a low bandwidth from a second communication channel having a high bandwidth comprising the steps of:

detecting a percentage average transmit bandwidth;

determining the amount of time of the data communication device has been connected using the second communication channel;

initiating a connection to the first communication channel when the percentage average transmit bandwidth rate obtained in the detecting step is less than a predetermined decrease threshold value for a predetermined time;

detecting a percentage average receive bandwidth; and initiating a connection to the first communication channel when the percentage average receive bandwidth obtained in the detecting step is less than the predetermined decrease threshold value for a predetermined time.

8. The method of claim 7, wherein the first communication channel is the D channel of an ISDN connection and the second communication channel is a B channel of said ISDN connection.

9. The method of claim 7, wherein the decrease threshold value is between 10 and 20 percent of the second communication channel bandwidth.

* * * * *